United States Patent [19]

Monia

[11] Patent Number: 4,734,145
[45] Date of Patent: Mar. 29, 1988

[54] METHOD FOR MAKING A MAGNETIC TRANSDUCER HEAD CLEANING CARD

[75] Inventor: Victor Monia, Santa Clara, Calif.

[73] Assignee: Visa Technologies, Inc., Mountain View, Calif.

[21] Appl. No.: 909,613

[22] Filed: Sep. 22, 1986

Related U.S. Application Data

[62] Division of Ser. No. 704,613, Feb. 22, 1985.

[51] Int. Cl.[4] .............................................. B29C 47/06
[52] U.S. Cl. ........................... 156/244.11; 156/244.18; 360/128; 360/133; 360/137
[58] Field of Search ..................... 156/244.11, 244.18; 360/2, 128, 133, 137

[56] References Cited

U.S. PATENT DOCUMENTS

| | | | |
|---|---|---|---|
| 2,994,940 | 8/1961 | Ferrell et al. | 156/244.11 |
| 3,402,086 | 9/1968 | Smith et al. | 156/244.11 |
| 4,106,067 | 8/1978 | Masuyama et al. | 360/137 |
| 4,374,404 | 2/1983 | Davis | 360/133 |

FOREIGN PATENT DOCUMENTS 181422 5/1986 European Pat. Off. ............ 360/128

OTHER PUBLICATIONS

Dillon, "Device for Cleaning Head in Magnetic Card or Reader", IBM Tech. Disc. Bull., vol. 21, No. 8, Jan. 1979.

Primary Examiner—Caleb Weston
Attorney, Agent, or Firm—Cushman, Darby & Cushman

[57] ABSTRACT

A card is provided for cleaning transducer heads of magnetically-encoded card reading machines. The card includes a surface region disposed for contacting such a transducer head and releasably holds a head cleaning solvent adjacent the surface region. The material forming the surface region may be visually distinguishable when it is holding solvent as compared to when it is not. Further, this material may be translucent when holding solvent. If so, the material immediately next to the solvent-holding material is a color which is visible through the material. Also, the card may have layers which are joined by heat-bonding. The side of the card opposite from the surface region then preferably is another color.

5 Claims, 3 Drawing Figures

METHOD FOR MAKING A MAGNETIC TRANSDUCER HEAD CLEANING CARD

This is a division of application Ser. No. 704,163, filed Feb. 22, 1985.

BACKGROUND OF THE INVENTION

The present invention relates to a card for cleaning magnetic transducer heads in an encoded card reading machine. More specifically, it relates to such a card for releasably holding a head cleaning solvent adjacent a visually distinguishable surface region disposed for contacting such a transducer head.

In recent years, with the proliferation of credit cards, what are referred to as automatic teller machines have sprung into generally universal use by banks and other financial institutions for providing automated teller services. That is, a customer of such a financial institution may use such a machine to perform various financial transactions which normally would require a teller or clerk employed by the bank to handle. Such transactions might include withdrawing cash from a checking or savings account or obtaining a cash advance from a credit card account, making a deposit to any of the three accounts just mentioned, or transferring funds between the various accounts.

Access to these accounts is provided by inserting a magnetically encoded-card in the machine which then reads the magnetically encoded information from the card. A code is then typed in by the customer which must be matched with the code stored by the computerized processor controlling the operation of the machine. If the codes match then the customer is allowed to perform the various transactions described.

One of the problems which exist with such a card-reading machine is that, as with other magnetic-media-sensitive tranducer heads, the actual head picks up contaminants from the media during repeated reading operations. The heads are in very inconvenient positions for cleaning.

This cleaning problem has been solved by providing a generally transparent card formed of a polyester backing to which is adhered a piece of white fabric in a position where the magnetically encoded strip on a transaction card would be. Solvent is placed on the fabric and the card is inserted as a customer's card would be. The teller machine attempts to read the card and, not finding a magnetic code on it, rejects it. However, during the attempted reading process, the transducer head is moved across the fabric. The solvent held by the fabric, in combination with the texture of the fabric, cleans the head.

While this type of card has provided an improvement in the facility with which transducer heads may be cleaned, it has some inherent problems. One of these problems is that the adhesive which holds the fabric to the base material has non-polymerized components which leach out while the card is wet with solvent. These leached components correspondingly become contaminants which decrease the effectiveness of the solvent and become lodged on the transducer head, thereby preventing a complete cleaning of the head surface. Further, it is difficult for a lay person, such as a bank clerk, to look at a card to determine whether there is solvent on the card.

SUMMARY OF THE INVENTION

The present invention provides a card, and a method for making a card, having a surface region disposed for contacting, by at least a portion of the region, a transducer head in a magnetically-encoded-card reading machine. The card releasably holds a head cleaning solvent adjacent the head-contacting surface region. Further, means are included for visually determining when that particular surface region has solvent.

In particular, a first layer having the surface region is made of a material, such as a fabric, capable of releasably holding such solvent, and which has an exposed face including the head-contacting surface region. This first layer is translucent when holding solvent and generally opaque when not. An intermediate layer joined to the first layer is a first color. When the fabric contains solvent, this color shows through so that the face of the first layer appears to have the color of the substrate. The other side of the card is formed of a second layer which is the second color, and thus, is visually distinguishable from the solvent-holding layer.

Another salient feature of the instant invention is that the solvent-holding layer be non-adhesively bonded to an adjacent layer. This prevents the leaching of contaminants from an adhesive layer into the solvent.

During a transducer head cleaning operation, it is desirable to first clean the head with solvent and then polish the head with non-solvent-carrying material. An important aspect of the instant invention provides for the use of a fabric which has a different physical appearance when it is holding solvent as compared to when it is not. Thus, an inexperienced person cleaning the head of a teller machine is able to easily determine visually when solvent has evaporated from the solvent-holding material. After the initial cleaning, the card may be held until the solvent has evaporated. The card is then reinserted into the machine for the final polishing step.

The present invention also provides a method for making such a head cleaning card. One preferred method of practicing the method of the invention is to provide a layer of material which is generally rigid at ambient conditions. This may be provided by heat plastifying a quantity of thermoplastic material and extruding the heat plastified material into a layer. A layer of fabric capable of releasably holding solvent is heat bonded onto the extruded layer. If the fabric is translucent when holding solvent, an intermediate layer which is a color distinguishable from the extruded layer is provided. To produce such a card, separate quantities of thermoplastic material having distinguishable colors may be heat plastified. The two plastified quantities are co-extruded to form an overall layer of thermoplastic material having a face of each color. The fabric is heat bonded to one of those faces.

It can be seen that a card made according to the present invention makes it easy for a person using it to determine which region of the card surface carries solvent and to determine when that region does not carry solvent. Further, such a card does not itself contaminate the solvent through leaching of adhesive components. The invention includes other features and advantages which will be described or will become apparent from the following more detailed description of a preferred embodiment.

BRIEF DESCRIPTION OF THE DRAWINGS

With reference to the accompanying sheet of drawing.

DETAILED DESCRIPTION OF PREFERRED EMBODIMENTS AND PREFERRED METHOD OF PRACTICING THE INVENTION

Figure 1:
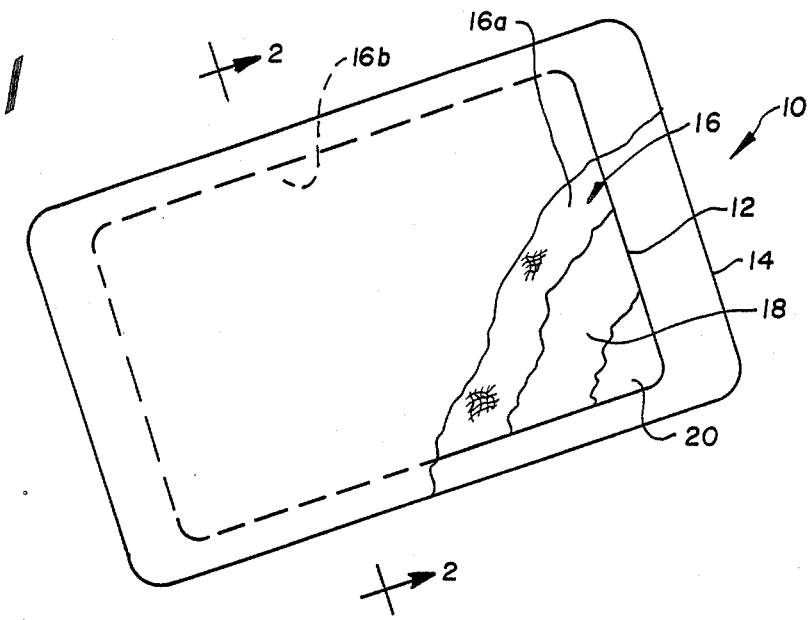
FIG. 1 is a face view of a card made according to the present invention contained within a solvent evaporation-inhibiting bag with portions broken away to show underlying structure.

With reference to the accompanying drawing, FIG. 1 is a face view of a package, shown generally at 10, including a card 12 and an enclosing bag 14. As shown, also with reference to FIG. 2, card 12 includes means having a surface region disposed for contacting, by at least a portion of the region, a transducer head in a magnetically-encoded-card reading machine, for releasably holding a head cleaning solvent next to the surface region. More particularly, card 12 includes a first layer 16 having an exposed face 16a which is capable of releasably holding a head cleaning solvent. Face 16a, also referred to as a surface region, includes a portion 16b shown in dashed outline in FIG. 1 which is disposed in an area equivalent to a magnetically-encoded strip on a transaction card. Surface region portion 16b is therefore the portion of face 16a which would be in contact with a transducer head during a cleaning operation.

Depending on the orientation of card 12 during use, a corresponding strip of surface region on the other side of face 16a could also come in contact with the transducer head. In order to permit use in either orientation as well as for ease of manufacture, the entire upper face of the card is covered with fabric 16. The fabric is preferably formed of a rayon/wood pulp material such as style No. 8801 provided by Du Pont Corporation. Also, other fabrics, woven or non-woven, such as a polyester, non-woven material supplied by Du Pont under the trademark Reemay Style 2024 may also be used.

A solvent which is preferably used for the cleaning operation is one containing a fluorocarbon chemical, such as trichlorotrifluoroethane which is marketed under Du Pont's trademark "Freon" as Freon TF. This product is particularly useful because it is nonflammable, chemically and thermally stable, low in toxicity, has a very low surface tension and a very high density.

Layer 16 has a generally opaque white appearance when dry. When wet with solvent, it becomes translucent, transmitting the appearance of the surface immediately next to it. An intermediate layer 18 is joined at one face to layer 16. Joined to the other face of layer 18 is what is a second layer 20. Intermediate layer 18 and second layer 20 are preferably formed of acrylonitrile-butadiene-styrene (ABS) terpolymer. This is a thermoplastic material suitable for extruding, as will be discussed subsequently, and which is very stable in the presence of the particular solvent just described. Other suitable materials, such as polyethylene, polypropylene, nylon and poly carbonate resins may be used in place of the ABS.

As will also be described later, layer 18 is joined to layer 16 by a process referred to as heat bonding. This provides the attaching of the two lamina without the use of adhesives.

The present invention provides means for defining a first color in the surface region of fabric 16 and defining a second color in at least a portion of the remaining surface of card 12. More particularly, in the embodiment shown in FIGS. 1 and 2, intermediate layer 18 is formed in one color, such as pink, (since layer 16 is translucent when wet with solvent) while second layer 20 is formed in a second visually distinguishable color, such as blue.

Bag 14 is of generally conventional construction, being typically formed (describing from the outside to the inside) of 26 lb. paper laminated with 7 lb. polyethylene, followed by a layer of thirty-five gauge aluminum foil. Polyethylene sealant of about 1.5 mil thickness is added as an internal layer to seal the solvent inside the bag during transmission of the card prior to use.

During use, a person desiring to clean the transducer heads of a card-reading machine removes card 12 containing the solvent from the bag. Card side 20 has a blue color whereas face 16a has a pink color due to the transmission of the color of substrate 18 through now translucent layer 16. The person doing the cleaning can thus easily distinguish which side has the solvent. The card is inserted in a machine to be cleaned as a normal transaction card would be inserted. The machine goes through the motion of reading. Finding no magnetic encoding, it rejects the card. The card is then held in the ambient atmosphere until the solvent evaporates from the fabric. When this evaporation is complete, the fabric, being uncolored and generally opaque, takes on a white appearance. The cleaning person can then visually see that the solvent has evaporated. The card is then reinserted into the machine to polish any remaining contaminants off the transducer head.

The entire thickness of card 12 is between 30 and 32.5 mils (762 and 825 microns). The fabric preferably has a thickness of 8 to 11 mils (203 to 279 microns), the combination of substrate 18 and second layer 20 has a total thickness of 19 to 23 mils (483 to 584 microns). Substrate 18 and second layer 20 can each have a range of between approximately 1 and 19 mils (25 and 483 microns) as long as the two form the appropriate total thickness.

Figure 3:
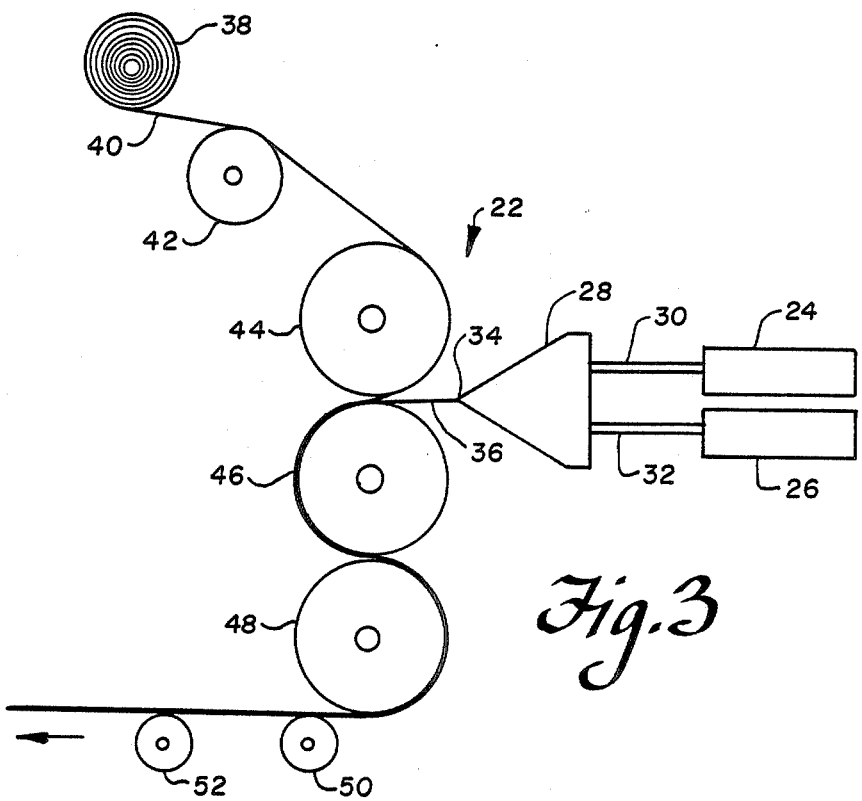
FIG. 3 is a simplified schematic illustration of apparatus for practicing a preferred method of the invention.

Referring now to FIG. 3, an apparatus suited for the practice of the method of the invention is shown generally at 22. Production apparatus 22 includes a first extruder 24 containing heat plastified ABS material of a first color, such as pink. A second extruder 26 also contains heat plastified ABS material, but of a second color such as blue. Extruders 24, 26 are joined in operative communication with a die 28 through a pair of conduits 30, 32, respectively. Die 28 has an extrusion orifice 34 from which issues a composite stream 36 of thermoplastic resinous ABS material, preferably at a temperature of approximately 375° F. (190° C.).

Figure 2:
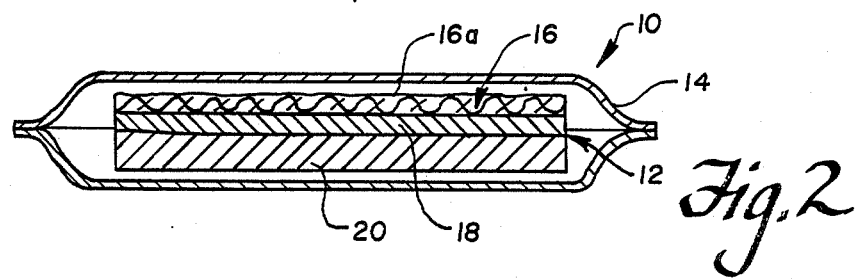
FIG. 2 is a cross-section of the card and bag package taken along line 2—2 in FIG. 1.

A fabric 40 feeds off of a roll 38 past a combination of rollers 42, 44, 46 and 48. Rollers 44, 46 press fabric 40 against ABS stream 36, which is at a temperature suitable for heat bonding the two together. Stream 36, when making the embodiment shown in FIGS. 1, 2, has a cross-sectional appearance as shown in FIG. 2 including an upper layer forming intermediate layer 18 of card 12 and a lower layer forming second layer 20. The heat bonded combination of ABS material and fabric 40 is then cooled around drums 46, 48 and delivered across carrier rollers 50, 52.

The resulting film of composite material is then cut into a size suitable for insertion into a card-reading machine. Sufficient solvent is added to the card to wet the fabric and it is then isolated from the ambient atmosphere to prevent evaporative loss by insertion into a bag 14 in which it is sealed.

From the above, it will be seen that the head cleaning card and method of making the card of the present invention provide a card having several features which represent improvements over the prior art. In particular, the side of the card containing the fabric and solvent is readily identifiable when the card is removed from a bag. Further, a visual difference existing in the fabric when it is holding solvent as compared to when the solvent has evaporated shows first that sufficient solvent exists to properly clean a transducer head and, after cleaning, to show when the solvent has evaporated for the final step of polishing the transducer head. Further the method of heat bonding the various materials, colored appropriately for the desired final embodiment, provides a card which is not subject to degradation from storage with a solvent.

Although the card, and its method of being made, have been described in connection with preferred embodiments, it will be appreciated that various changes and modifications can be made without departing from its spirit. It is therefore intended that the coverage afforded applicant be limited only by the claims and their equivalent language.

What I claim is:

1. In a method of producing a head cleaning card for holding solvent for cleaning transducer heads of a magnetically-encoded-card reading machine, providing a layer of material which is generally rigid at ambient conditions, and heat bonding the layer of material onto a layer of fabric capable of releasably holding solvent and capable of changing color when said solvent is consumed.

2. The method of claim 1 wherein said step of providing includes heat plastifying a quantity of thermoplastic material and extruding the heat plastified material into said layer.

3. The method of claim 2 wherein said step of heat bonding is performed using the heat resulting from said extruding.

4. The method of claim 2 wherein said plastifying further includes plastifying separate quantities of thermoplastic material having distinguishable colors, said extruding further including the step of co-extruding the quantities of thermoplastic material into a single layer having a face of each color, and the fabric is further characterized as being translucent when holding solvent.

5. A method of producing a head cleaning card package for holding freon-containing solvent for cleaning transducer heads of a magnetically-encoded-card reading machine comprising:
   heat plastifying two separate quantities of thermoplastic material having distinguishable colors;
   co-extruding the quantities of thermoplastic material into a layer having a face of each color;
   heat bonding onto one face of the extruded layer a layer of resinous fabric capable of releasably holding such solvent and being characterized as being translucent when holding the solvent;
   cutting from the bonded layers a card suitable for insertion adjacent the transducer heads of a card-reading machine;
   applying sufficient solvent to the card to wet the fabric; and
   isolating the solvent-wetted card from the ambient atmosphere in a manner preventing substantial loss of solvent from the card.

* * * * *